United States Patent
Donoghue et al.

(10) Patent No.: US 8,527,632 B2
(45) Date of Patent: Sep. 3, 2013

(54) SECURE TRANSFER OF DATA FILES

(75) Inventors: Tony John Donoghue, Crowthorne (GB); Stephen Clements, Windsor (GB)

(73) Assignee: ISEEU Global Limited, Bracknell, Berkshire (GB)

( * ) Notice: Subject to any disclaimer, the term of this patent is extended or adjusted under 35 U.S.C. 154(b) by 534 days.

(21) Appl. No.: 12/420,534

(22) Filed: Apr. 8, 2009

(65) Prior Publication Data
US 2009/0259729 A1    Oct. 15, 2009

(30) Foreign Application Priority Data
Apr. 11, 2008    (GB) .................................... 0806566.6

(51) Int. Cl.
*G06F 15/16*    (2006.01)

(52) U.S. Cl.
USPC .......................................................... 709/225

(58) Field of Classification Search
USPC ................. 709/201, 204, 205, 206, 217, 218, 709/219, 224
See application file for complete search history.

(56) References Cited

U.S. PATENT DOCUMENTS

| | | | | |
|---|---|---|---|---|
| 5,790,790 A * | 8/1998 | Smith et al. | .................... | 709/206 |
| 6,275,848 B1 | 8/2001 | Arnold | | |
| 6,385,644 B1 * | 5/2002 | Devine et al. | ................. | 709/206 |
| 7,051,003 B1 | 5/2006 | Kobata | | |
| 2002/0019935 A1 * | 2/2002 | Andrew et al. | ............... | 713/165 |
| 2002/0143995 A1 * | 10/2002 | Yeh | ............................... | 709/246 |
| 2004/0143650 A1 | 7/2004 | Wollowitz | | |
| 2005/0039130 A1 * | 2/2005 | Paul | .............................. | 715/730 |
| 2005/0273365 A1 | 12/2005 | Baumgartner et al. | | |
| 2006/0177114 A1 | 8/2006 | Tongdee et al. | | |
| 2006/0242148 A1 | 10/2006 | Rothpearl et al. | | |
| 2006/0277075 A1 | 12/2006 | Salwan | | |
| 2007/0078679 A1 | 4/2007 | Rose | | |
| 2007/0150311 A1 | 6/2007 | Lazerus | | |
| 2007/0168657 A1 * | 7/2007 | Carro | ............................ | 713/156 |
| 2007/0253533 A1 | 11/2007 | Soukal | | |
| 2008/0046518 A1 * | 2/2008 | Tonnison et al. | ............. | 709/206 |
| 2008/0222684 A1 * | 9/2008 | Mukraj et al. | ................... | 725/86 |

FOREIGN PATENT DOCUMENTS

| | | |
|---|---|---|
| EP | 1217556 A2 | 6/2002 |
| EP | 1233584 A | 8/2002 |
| EP | 1298885 A2 | 4/2003 |

OTHER PUBLICATIONS

"Script," posted Aug. 21, 2000 on <http://searchenterpriselinux.techtarget.com/definition/script>.*

* cited by examiner

*Primary Examiner* — Scott Christensen
(74) *Attorney, Agent, or Firm* — Arthur Jacob

(57) ABSTRACT

The secure transfer of data files between secure environments (202, 211) is disclosed. At a source environment (202) a user issues a request via a first local terminal (205J) to transmit one or more selected data files (101) to a specified recipient (211) by identifying the data files and the recipient's email address. The transmission of the data file is approved, possibly by a supervisor (208) and a copy of the selected data file is made to an encrypted storage device. An email is issued to the recipient (211) identifying the location of the selected file and a first password. The selected data file is transferred to the recipient in response to the recipient identifying the location and providing the first password. Preferably, a second one-time password is provided via an alternative mode of communication.

19 Claims, 18 Drawing Sheets

| LAST NAME | TITLE | FIRST NAME | ORGANISATION | |
|---|---|---|---|---|
| LN1 | T1 | FN1 | ORG1 | SELECT |
| LN2 | T2 | FN2 | ORG2 | SELECT |
| LN3 | T3 | FN3 | ORG3 | SELECT |

Fig. 10

SECURE TRANSFER OF DATA FILES

CROSS REFERENCE TO RELATED APPLICATIONS

This application claims priority from United Kingdom Patent Application No. 08 06 566.6, filed Apr. 11, 2008, the whole contents of which are incorporated herein by reference in their entirety.

BACKGROUND OF THE INVENTION

1. Field of the Invention

The present invention relates to an apparatus for the secure transfer of one or more data files from a source to a recipient. The present invention also relates to a method of transferring data securely and a computer-readable medium.

2. Description of the Related Art

Systems for transferring data files from an organisation to a recipient outside the organisation are well known. Traditionally, this may involve sending hard copy in the post or when time critical, sending the data by courier.

Electronic mail is also well established for the transmission of machine-readable data but many organisations now include information governance systems which may place limits on the extent to which email may be used.

The use of email is difficult to control in that it is difficult to place safeguards on the extent to which data may be distributed throughout the Internet. It is also difficult to manage workflow in that in order for data to be transmitted outside the organisation, it may be necessary to seek managerial approval. However, in order for the workflow to be achieved in a reasonable time and to avoid placing unnecessary burden upon senior management, approval may be given by senior management but the task of actually sending the data may be delegated. Existing email systems do not lend themselves to the management of workflow in these situations.

A further problem with the use of existing email is that email attachments are held on many servers in a non-secure way. Thus, even when data is encrypted or compressed, it is likely that some information can be derived from file headers or file names etc.

A further problem also exists with email transmission in that it is usual practice for a limit to be placed on the size of the files that may be transmitted. These limits are continually increasing but at the same time data files are also increasing in size. Consequently, there is a risk that an urgent and important file required outside the organisation may be held up due to file size restrictions.

A further problem exists when file encryption is used for files sent as email attachments. In some circumstances, sensitivities may exist in terms of data being encrypted or compressed given that there is a risk that the data itself may in some way corrupted. In many situations such corruption is obvious but in some more critical situations such as, for example, the transmission of medical related data, the risk of such corruptions cannot be tolerated given that the modified data could be perceived as valid when not actually accurate. Thus, general encryption techniques are not encouraged within such environments.

It is therefore appreciated that an improved system is required for the transfer of data to a recipient outside an organisation in a secure and certain way so as to satisfy the requirements of information governance. However, it is also appreciated that such systems must be easy to use and particularly easy to use on the part of a recipient. Any complications may result in the recipient refusing to receive the data and ultimately this may then lead to previously adopted techniques being used, such as the data being dispatched by courier.

BRIEF SUMMARY OF THE INVENTION

According to an aspect of the present invention, there is provided an apparatus for the secure transfer of one or more data files from a secure source to a recipient. The invention comprises a processing device; a first storage device for storing instructions for facilitating said secure transfer; an encrypted storage device for storing encrypted copies of data files for secure transfer; and an interface device for communicating with a secure internal network and the Internet. In use, a source issues a request via a local terminal to transmit a selected file to the specified recipient by identifying the data file and a recipient address. In response to the command being approved by the processing device, a copy of the selected file is transferred to the encrypted storage device. A processing device issues an email to the recipient identifying the location of the selected data file for collection and a first password. The processing device transfers the selected file to the recipient in response to the recipient identifying said location and providing said first password.

BRIEF DESCRIPTION OF THE SEVERAL VIEWS OF THE DRAWINGS

FIG. 10 shows the user terminal of FIG. 9 being presented with search results.

DETAILED DESCRIPTION OF THE PREFERRED EMBODIMENTS

FIG. 1

Figure 1:
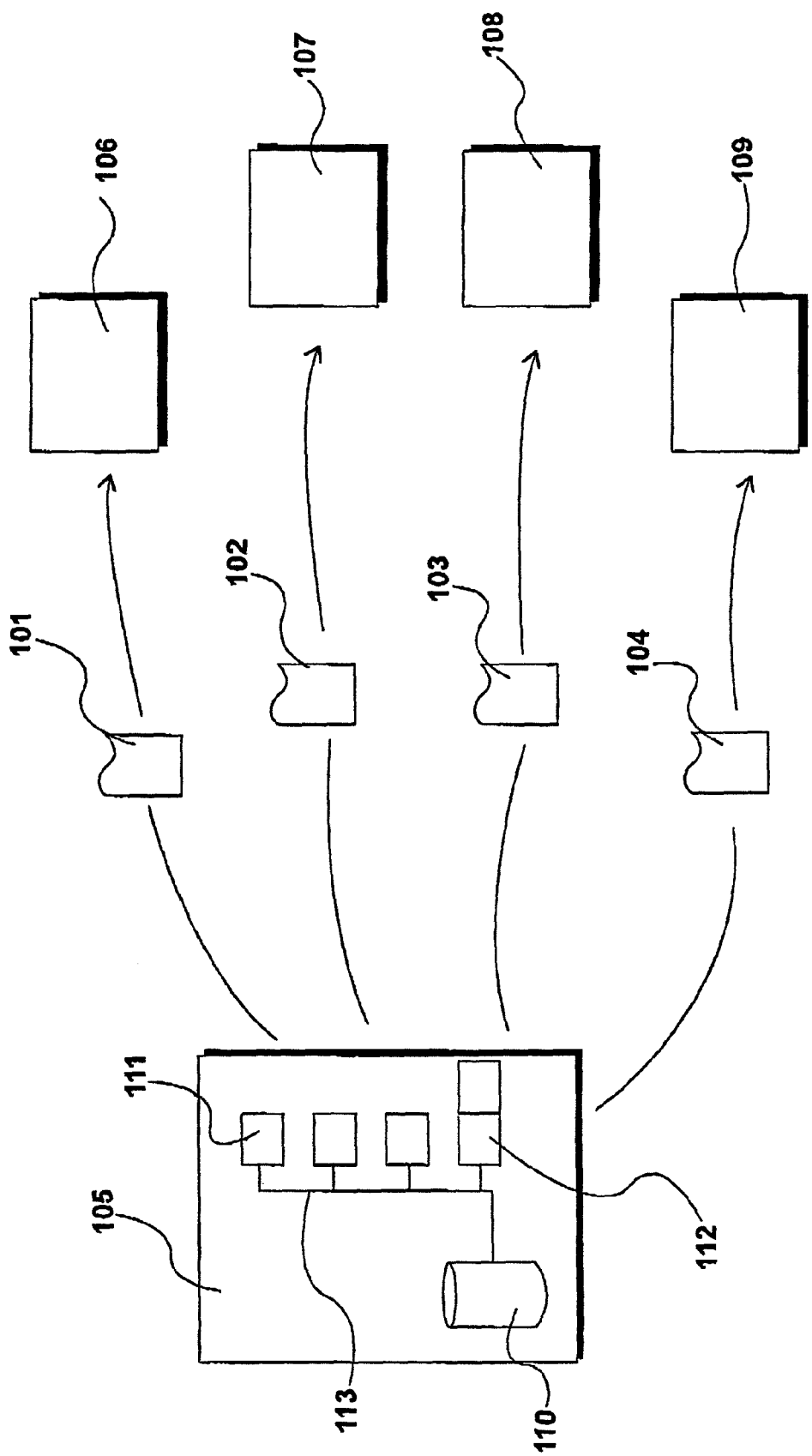
FIG. 1 shows an environment for transferring data files.

An environment for transferring data files 101 to 104 from a source 105 to recipients 106 to 109 respectively is illustrated in FIG. 1. At the source 105 the data files are held securely and redundantly on data storage devices 110. Within the organisation 105, the data is made available to users, such as user 111 and supervisor 112 via an internal network 113. Internal data network 113 is highly secure and does not include connections to networks outside the organisation 105.

Similarly, at organisation 106 and at organisation 107 any data received may be held securely within the organisation. However, a problem exists in terms of transferring data between organisations.

In order to facilitate the rapid transfer of data and to avoid the use of couriers, it is appreciated that the Internet would provide a desirable mechanism for the transfer of data files, such as file 101. However, such an approach would traditionally involve connecting internal network 113 to the Internet and the use of conventional email systems would create problems as previously discussed.

FIG. 2

Figure 2:
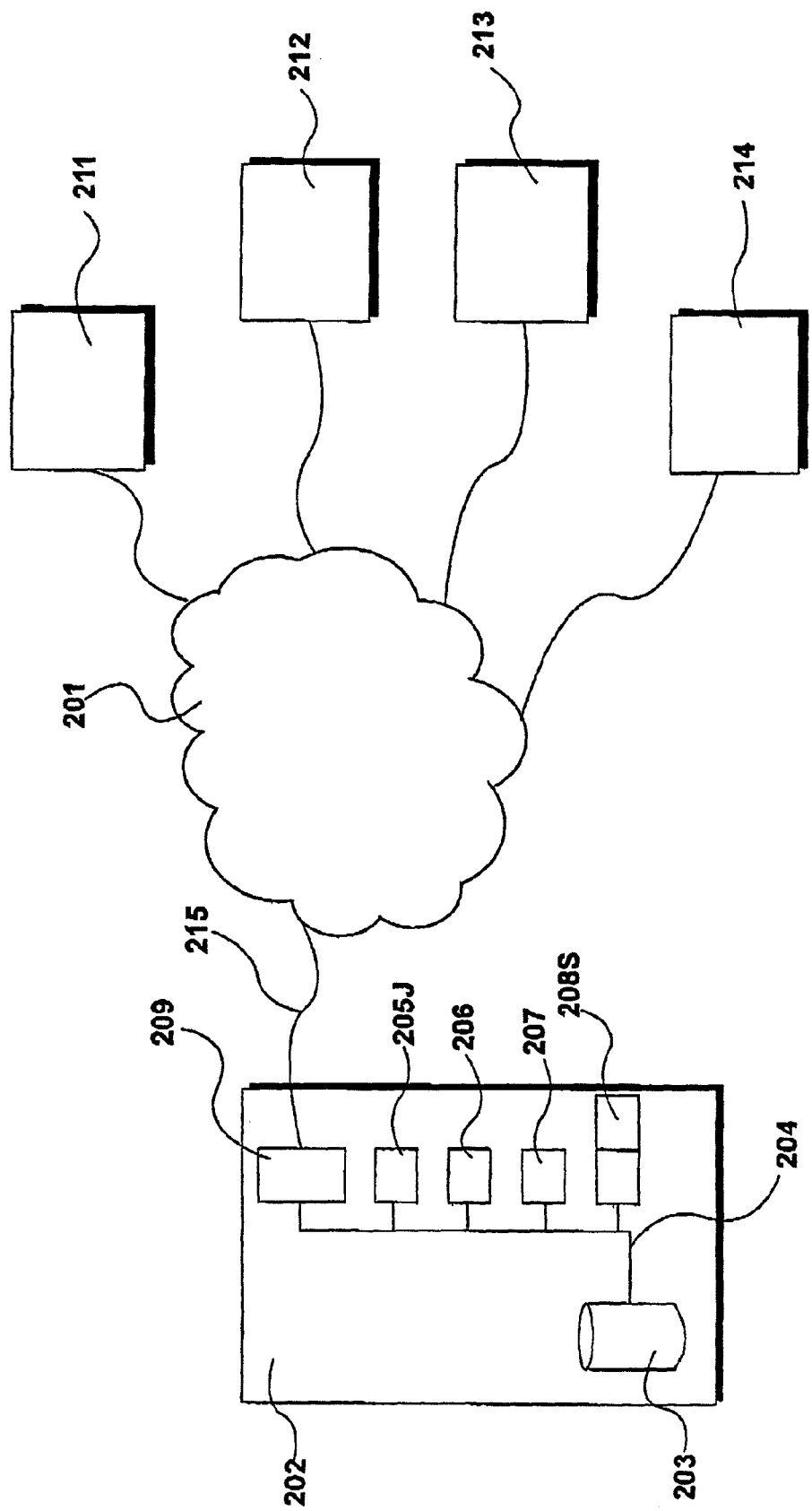
FIG. 2 shows an environment similar to FIG. 1 in which use is being made of the Internet.

An environment is shown in FIG. 2 which makes use of the Internet 201. Source organisation 202 is substantially similar to source organisation 105 and includes a secure and redundant data storage device 203 (similar to device 110). An internal network 204 connects users 205J, 206, 207 and 208S to the data storage device 203.

User 208S has supervisor status and as such actions taken by users 205J to 207 may require approval from supervisor 208S. For the purposes of illustration, as developed with reference to FIGS. 9 and 10, user 205J is considered to have a junior status with associated limitations.

Source organisation 202 differs is provided with a secure transfer apparatus 209, embodying an aspect of the present invention. The secure transfer apparatus 209 allows data to be copied from the secure storage device 203 for transmission to recipients 211, 212, 213 and 214 over the Internet 201. It is therefore connected to internal network 204 and to the Internet 201 via an external communication channel 215.

FIG. 3

Figure 3:
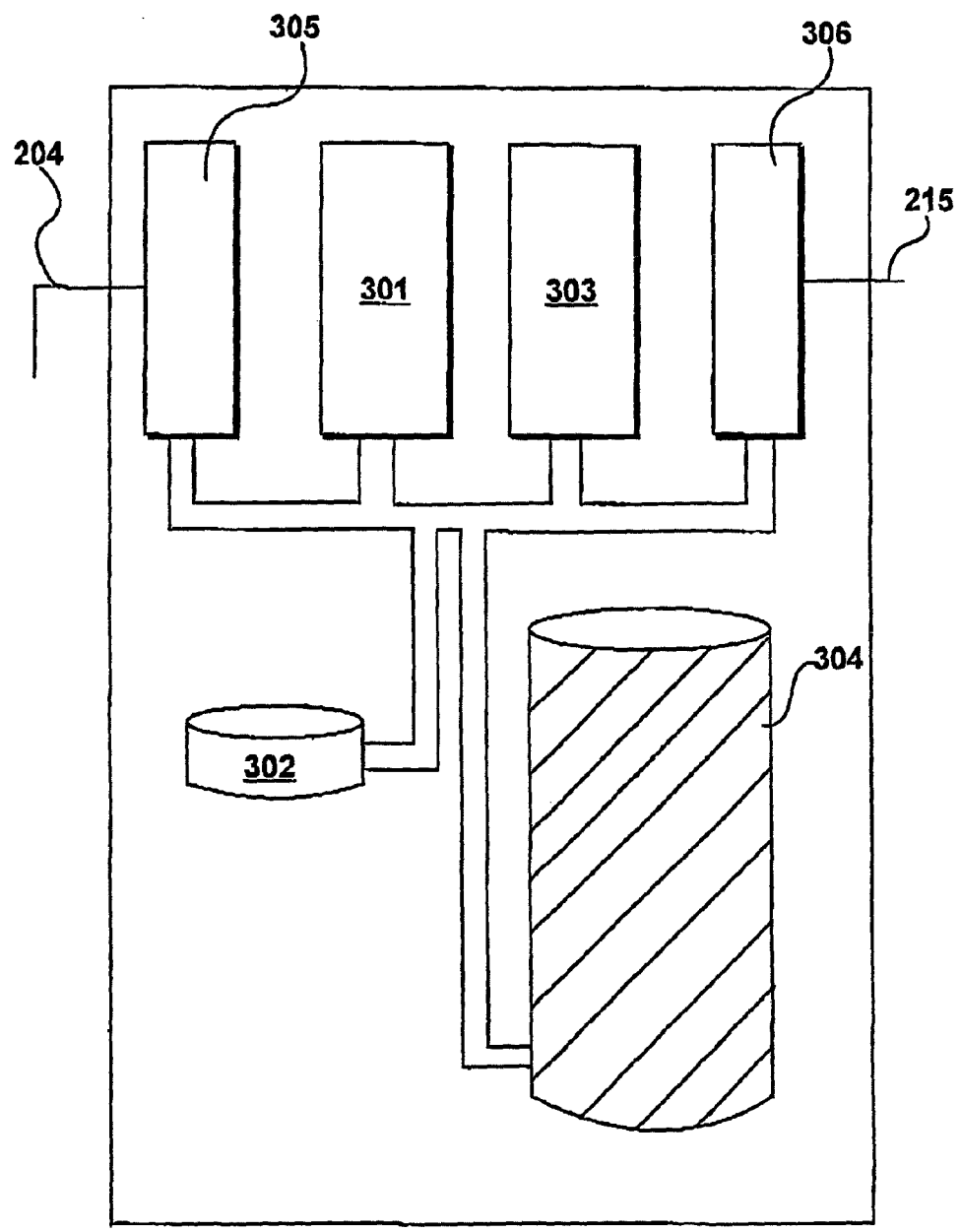
FIG. 3 shows identifies a secure transfer apparatus embodying and aspect of the present invention and identified in FIG. 2.

The secure transfer apparatus 209 is detailed in FIG. 3 and is configured for the secure transfer of one or more data files from the source, such as terminal 205J, to a recipient, such as recipient organisation 211.

In the preferred embodiment, the secure transfer apparatus 209 includes a processing device 301 and a first storage device 302 for storing instructions for facilitating the secure transfer of data files. After being installed on the first storage device 302, possibly via a transfer medium such as a CD or DVD, the instructions are written to a randomly accessible memory device 303 during an initiation process. This results in program instructions being available for commanding the processor 301, as detailed in FIG. 6.

The secure transfer apparatus 209 also includes an encrypted storage device 304 for storing encrypted copies of data files for secure transfer. Thus, these data files may be received locally from a terminal, such as terminal 5, but it is more likely that the source 205J will identity files for transfer from the bulk data storage device 203.

The first interface device 305 communicates with the internal network 204 and a second interface device 306 communicates with the external network 215.

FIG. 4

Figure 4:
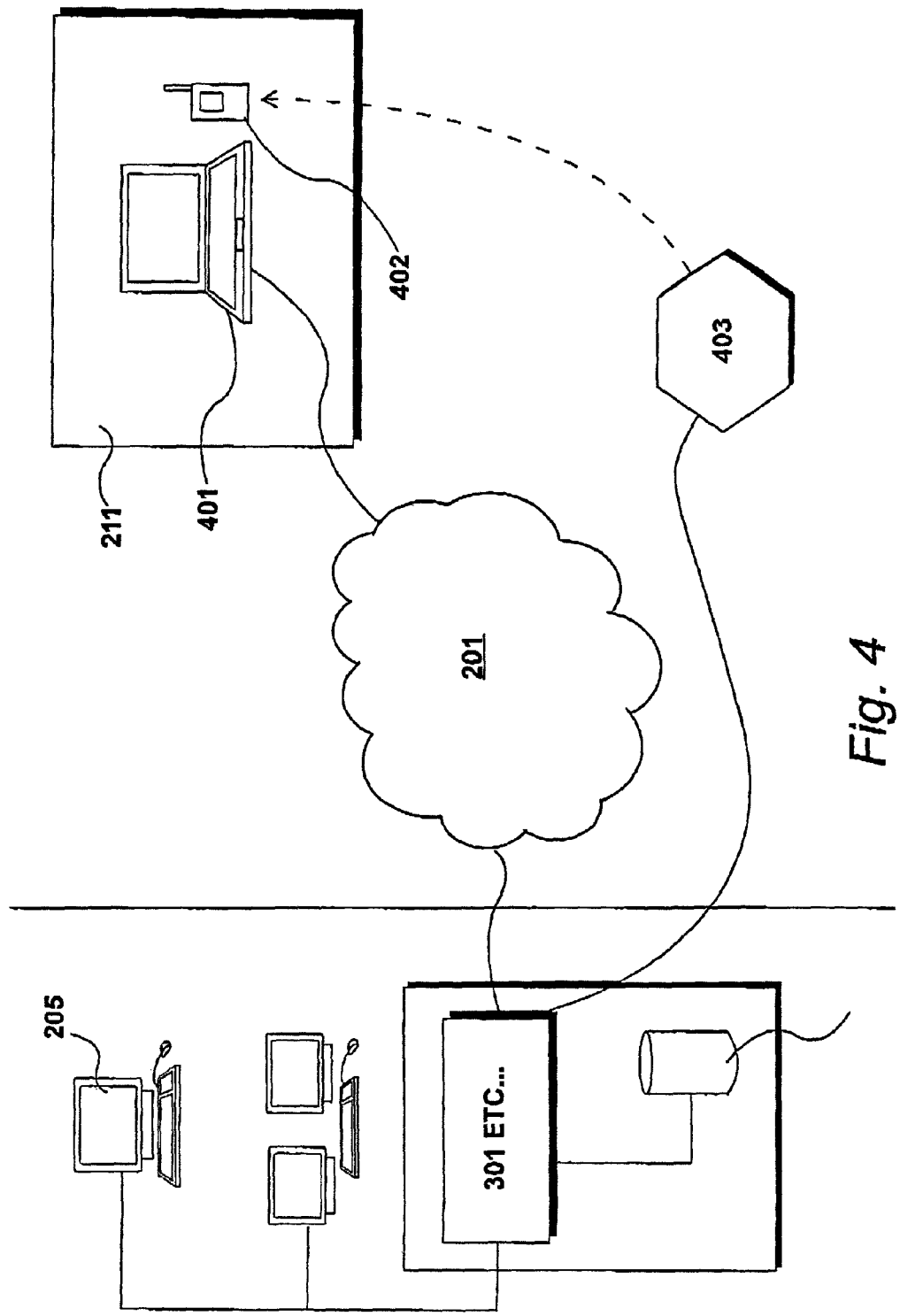
FIG. 4 identifies a preferred operation of the apparatus identified in FIG. 3.

Preferred operation of the secure transfer apparatus of FIG. 3 is illustrated in FIG. 4. A source, which may be considered as a terminal 205J or the bulk storage device 304 of the overall organisation 202, issues a request, by means of an operator using terminal 205J, to transmit one or more selected data files to a specified recipient by identifying a recipient's email address and the data files to be transferred.

In response to the request being approved by the processing device 301, a copy of the selected data file or files are transferred to the encrypted storage device 304, usually from the bulk data storage device 203.

The processing device 301 issues an email to the recipient identifying a location of the selected data file or files for collection. In addition, the processing device 301 identifies a first password in the email.

At the recipient organisation 211 a computer system 401 is provided with conventional browsing software such that computer 401 may log into a secure website served by the secure transfer apparatus 202. Thus, by providing user name and login information to this server, the files may be downloaded directly via the Internet 201.

In order to improve security, conventional encryption techniques are deployed using encryption certificates as is known in the art. Thus, in this preferred embodiment, the data is stored in encrypted form on disc 304 such that were device 304 to be stolen, the data contained thereon could not be accessed. However, encrypted disc 304 works in co-operation with processor 301 such that the encryption process is transparent to processor 301. Thus, having received (unencrypted) data from disc 304, a further process of encoding is performed in order to effect an encoded transfer between the organisations.

In a preferred embodiment, a second one-time password is also required and this one-time password is preferably transmitted via an alternative process. Thus, in a preferred embodiment, the on-time password is transmitted as an SMS message to a mobile telephone 402 present at the recipient's organisation 211. Thus, an SMS message identifying the one-time password is generated by processors 301 and supplied to mobile telephone 402 via a mobile cellular network 403.

FIG. 5

Figure 5:
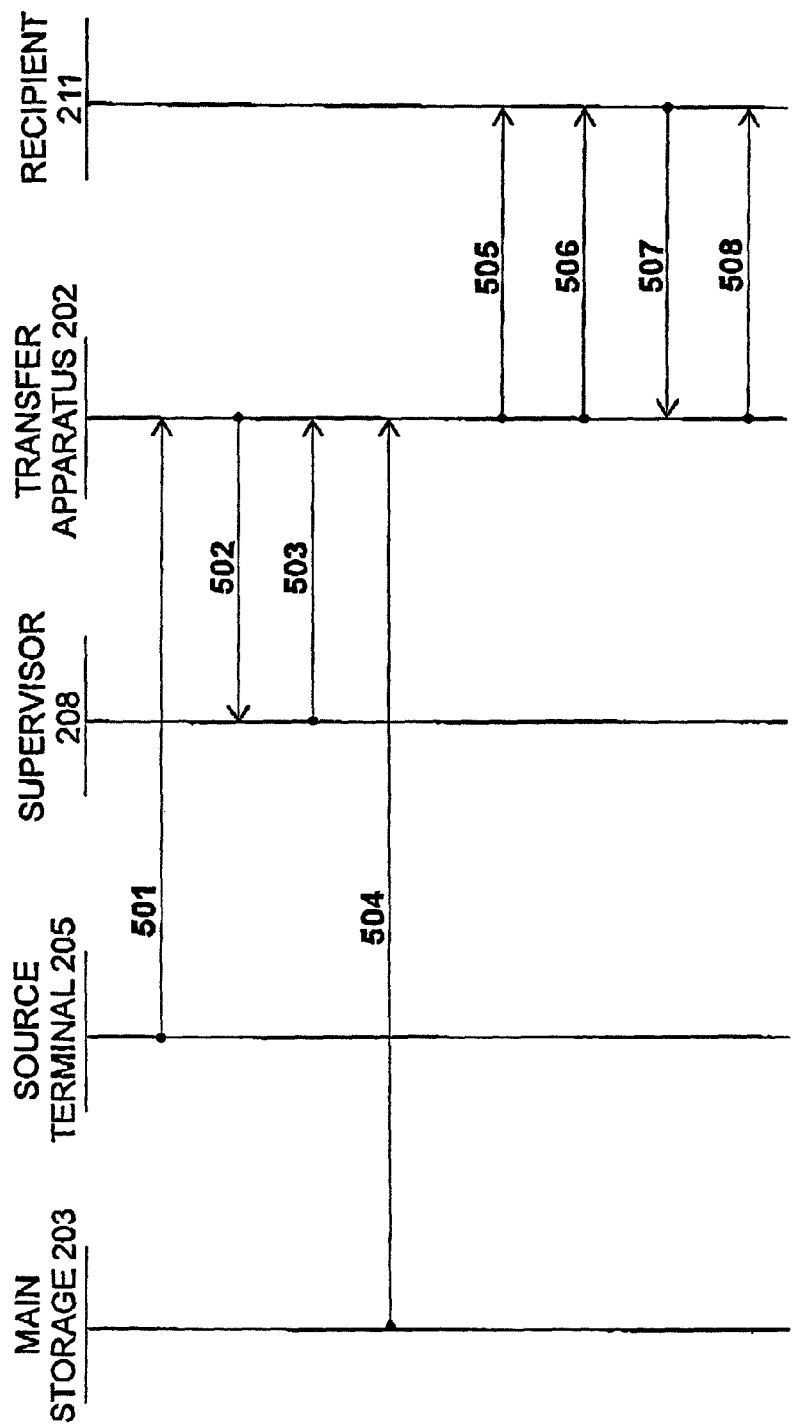
FIG. 5 shows details of a preferred method of operation for securely transferring data files.

A method of a preferred embodiment for securely transferring one or more data files from a source to a recipient is illustrated in FIG. 5, in the form of a protocol diagram.

In the protocol diagram, vertical lines represent the main storage 203, the source terminal 205J, the super secure transfer apparatus 202 and the recipient 211.

At 501 the source terminal 205J issues a request to the secure transfer apparatus 202 over the internal network 204. In order for this request to be made, it may be necessary for the internal user to go through a login procedure. Furthermore, the secure transfer apparatus 202 is aware of the status of the different users and is therefore configured to provide different levels of access.

The request 501 identifies specific data files, possibly held on storage device 203 and also identifies the email of the recipient. The recipient's details may be entered manually or the recipients details may be derived from an address book. Some users will only be able to send data to recipients identified in the address book.

At the transfer apparatus 202 a decision must be made concerning the approval of the transmission such that an approval is necessary if the selected data files are to be transferred.

In a first embodiment, approval is made locally at the secure transfer apparatus on the basis that the secure transfer apparatus is aware of the status of the user. Thus, for a user of sufficient status (say user 208S) the approval would be given automatically.

In a preferred embodiment, for users of lower status (205J), it is necessary to obtain authorisation from supervisor 208S. In this way, the supervisor could delegate the sending of data outside the organisation while at the same time retaining control over the transfer of data by the mechanism of providing authorisation.

Figure 13:
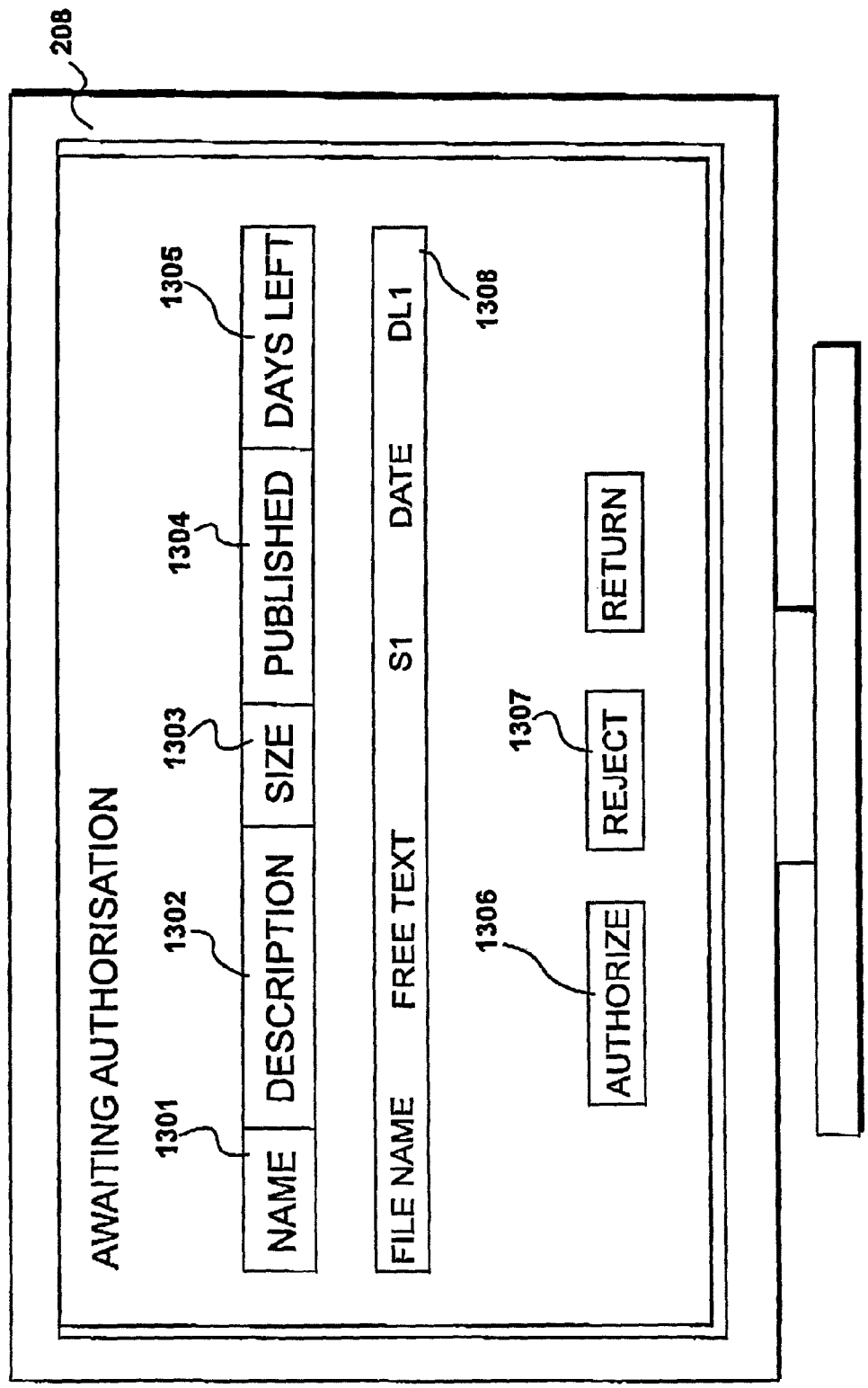
FIG. 13 shows a supervisor's terminal performing an authorisation.

In the protocol diagram of FIG. 5, a message 502 is supplied from the transfer apparatus 202 to supervisor 208S identifying files awaiting authorisation, as described with respect to FIG. 13.

When authorisation is given, this is confirmed back to the transfer apparatus 202, as illustrated at 503.

The selected data files from main storage 203 are copied to the encrypted storage device 304 as illustrated at 504.

The transfer apparatus 202 sends an email to the recipient 211 as illustrated at 505. This is followed, as illustrated at 506, by the transmission of a one-time password as an SMS message in the preferred embodiment.

At 507 the recipient 211 returns details of their user name, password and one-time password back to the transfer apparatus 202. Thereafter, as illustrated at 508, the data is transferred from the transfer apparatus 202 to the recipient 211.

FIG. 6

Figure 6:
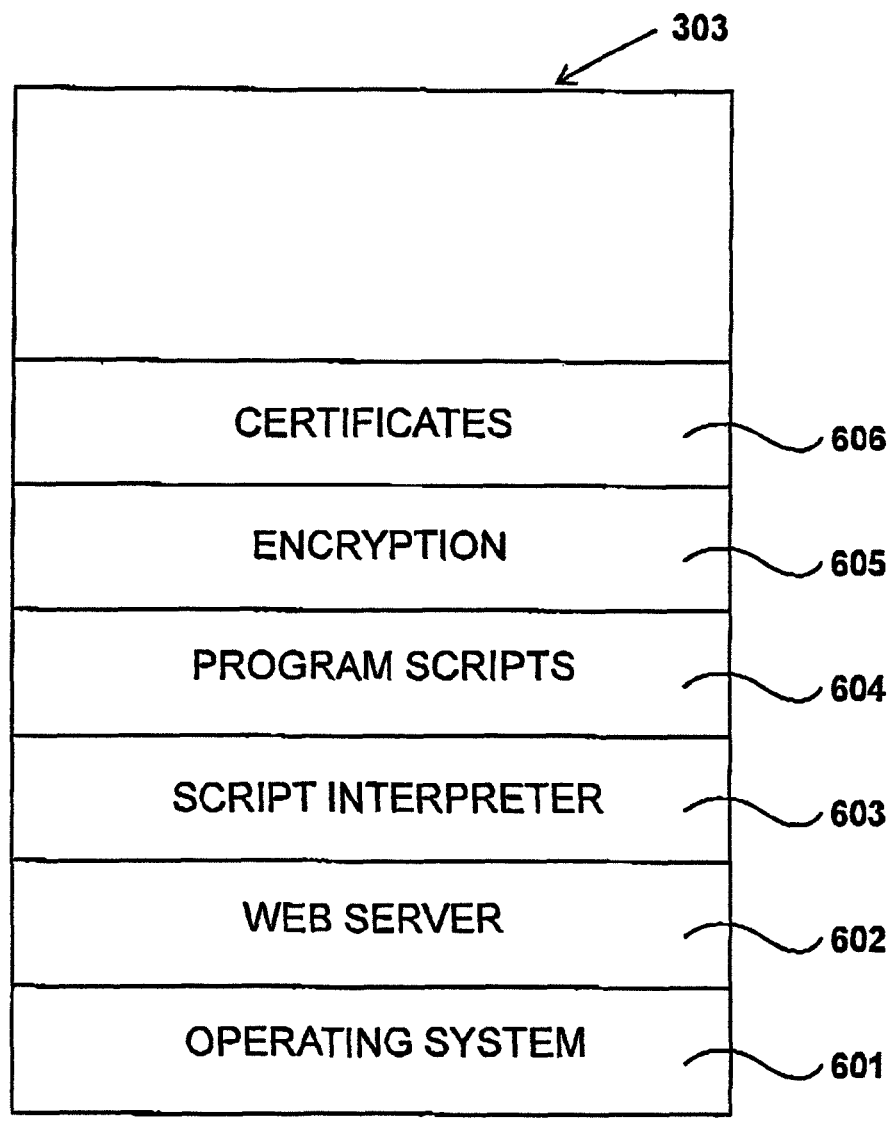
FIG. 6 shows a memory map for programmes installed on the apparatus of FIG. 3.

In a preferred embodiment, the procedures performed and described with reference to FIGS. 4 and 5 are conducted by the processing device 301 in response to program instructions received from memory device 303. A memory map of memory device 303 is illustrated in FIG. 6.

After program instructions have been installed, the storage device 303 stores instructions for operating system 601. At 602, instructions are stored for a web server and a script interpreter is stored at 603 operable with the environment created by the web server.

Program scripts are stored at 604 which are in turn interpreted by the script interpreter for operation within the web server environment.

For the transmission of data, an encryption routine is included at 605 and encryption certificates are stored at 606.

FIG. 7

Figure 7:
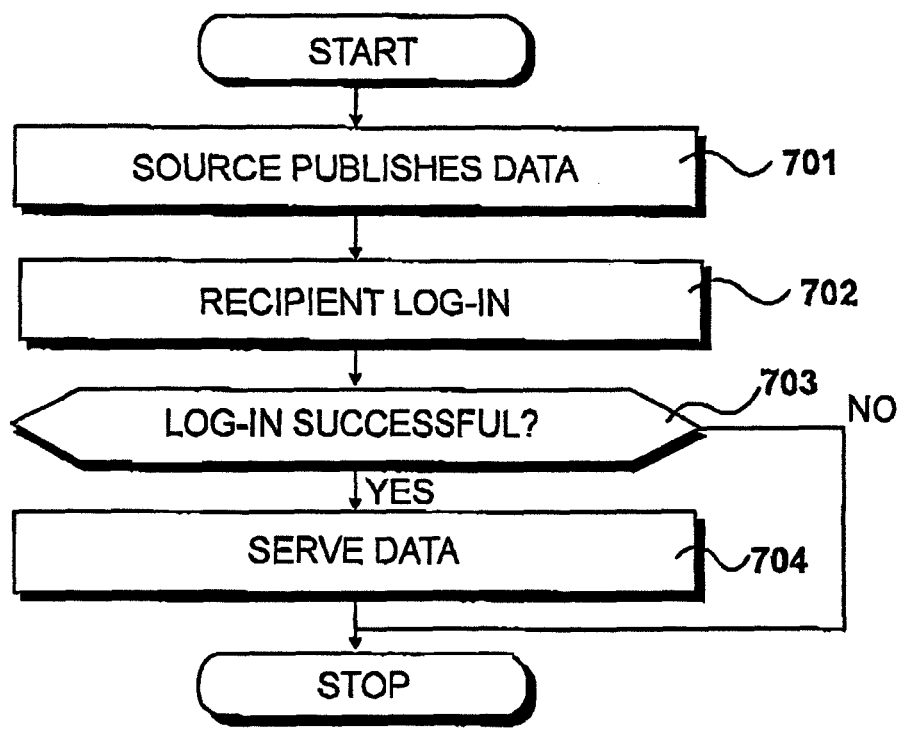
FIG. 7 shows operations performed by the transfer apparatus detailed in FIG. 3.

Operations performed by the secure transfer apparatus 209 in response to the program scripts 604 are illustrated in FIG. 7. At step 701 the source "publishes" data such that said data can be received by a recipient. Thus, as used herein, the publication of data refers to the making of a copy of data, usually from bulk data storage device 203, to the encrypted device 304.

Within the environment of the originating organisation 202, the individual user stations 205J to 208S do not have direct access to the external network 201. Similarly, these terminal devices 205J to 208S cannot directly transfer a data file from the bulk data storage device 203 to the external network 201 via a secure transfer apparatus 209. Secure transfer apparatus 209 is not seen by the individual stations 205J to 208S as a conventional network drive on the internal network 204. It is only possible to "publish" a data file by requesting the secure transfer apparatus 209 to fetch a copy from bulk storage and to make this copy available for download, subject to the appropriate security procedures being adopted.

Figure 15:
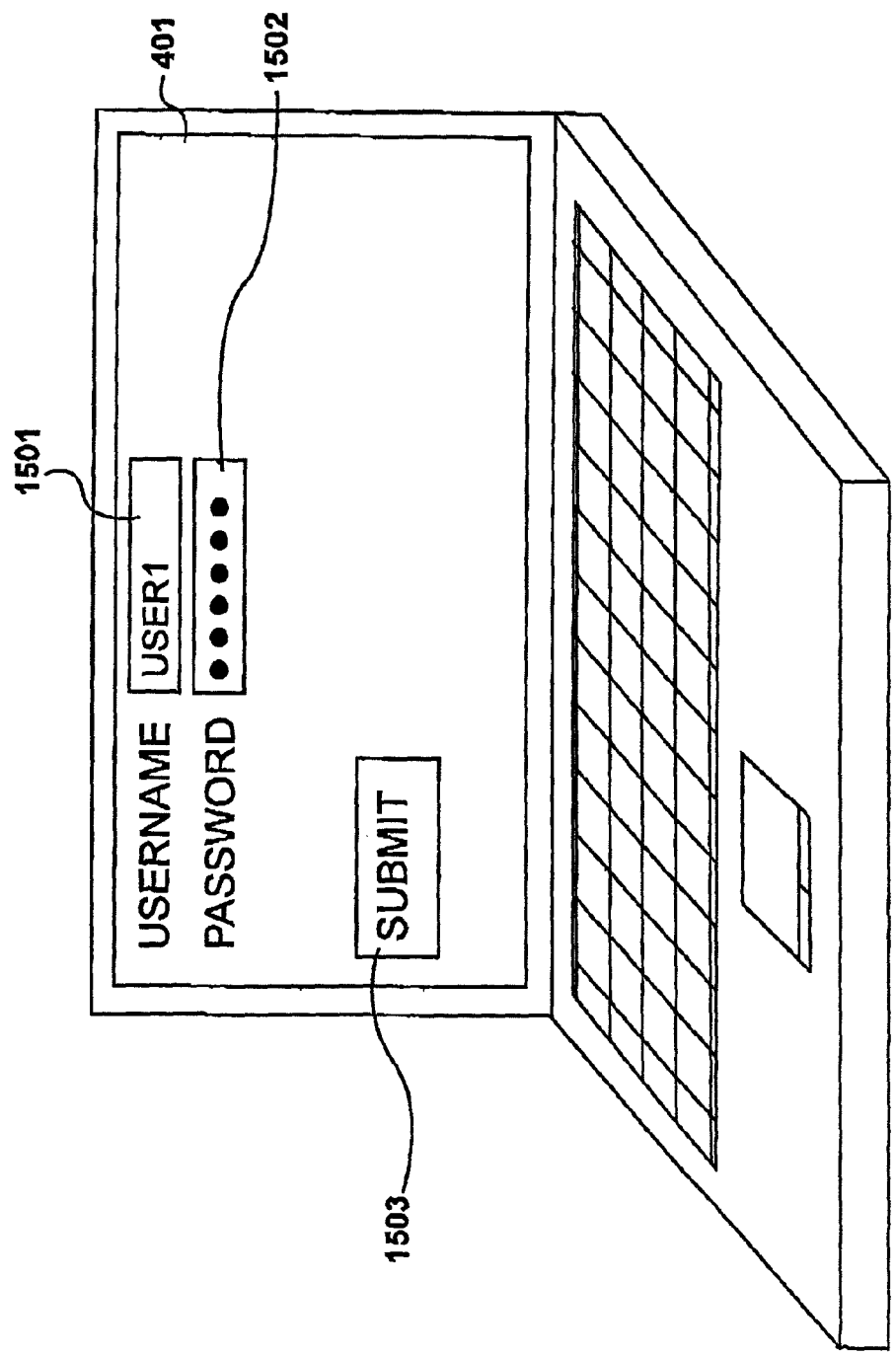
FIG. 15 shows details of a logging in procedure for the recipient.

At step 702 a recipient, having been notified of the availability of a data file or data files, logs in to the secure transfer apparatus 202 made possible by the web server environment under instructions 602. The recipient terminal 211 is then in a position to communicate with the secure transfer apparatus 202 using secure protocols such as HTTPS and the intended recipients 211 to 215 are provided with details of the appropriate domain name; allowing then to access a page from the secure transfer apparatus, as illustrated in FIG. 15.

At step 703 a question is asked as to whether the login process for terminal 211 has been successful and if answered in the affirmative, data is served to terminal 211 at step 704.

FIG. 8

Figure 8:
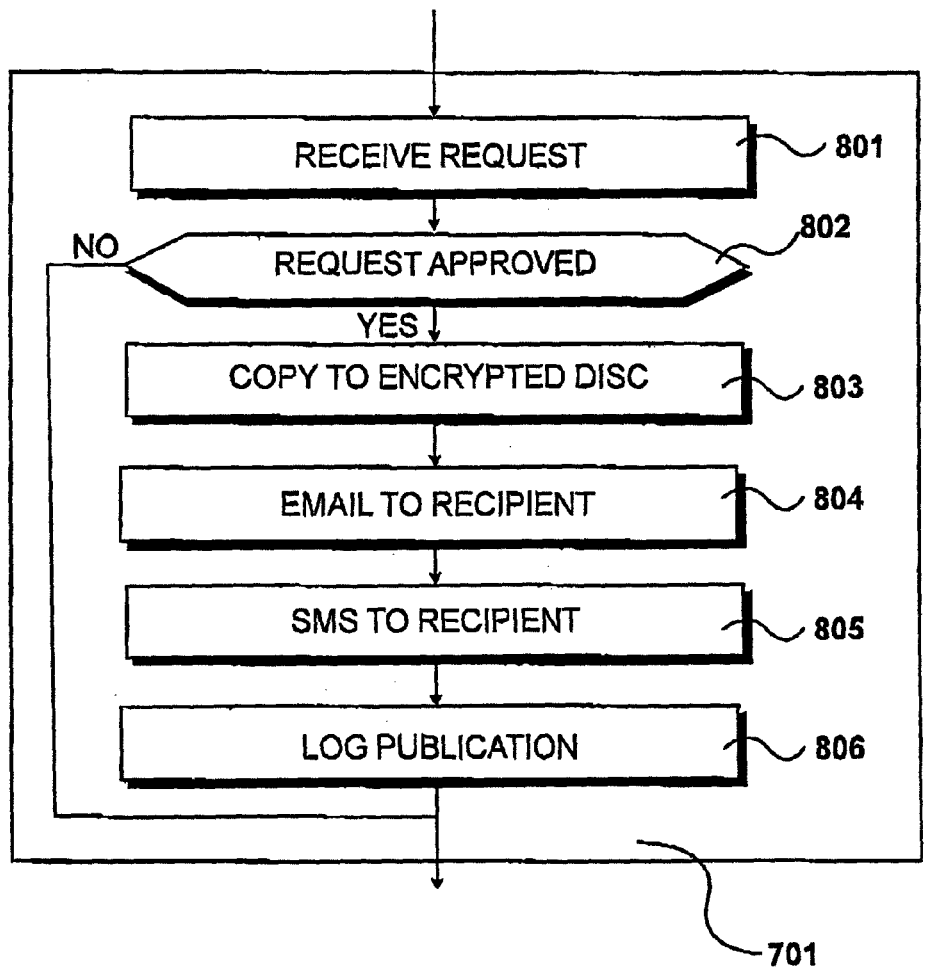
FIG. 8 details the publishing operation identified in FIG. 7.

Procedure 701 for the publishing of data are detailed in FIG. 8.

At step 801 the secure transfer apparatus 209 receives a request for a transfer of data to take place. In order to achieve this, the source operator identifies the name and location of the file to be transferred along with details of its destination.

At step 802 a question is asked as to whether the request has been approved and if answered in the negative, to the effect that the request has not been approved, no further action is taken and the file is not made available.

If an approval is obtained, a copy of the file is made at step 803 to the encrypted disc 304. At step 804 the secure transfer apparatus issues an email communication to the recipient 211 notifying the recipient to the effect that files are available and providing the recipient with a user name and a password.

At step 805, the secure transfer apparatus issues an SMS message to the recipient 211 for display on the recipient's mobile telephone 402. The message identifies the one-time password, which must be included in addition to the user name and password, in order for the data to be transferred. It should also be appreciated that other mechanisms for sending the one-time password may be deployed, such as radio pages or similar devices. Security is enhanced significantly by deploying a separate unrelated channel for the distribution of the one-time passwords.

Having notified the recipient to the effect that data is available, ie published within the environment of organisation 202, a log is made to this effect at step 806. Thus, not only does this secure transfer device provide a secure means of data transfer, it also provides an audit trail of the transactions that have taken place.

FIG. 9

In order for the secure transfer apparatus 202 to receive a request, as identified at 801, it is necessary for a user, say at terminal 205J, to log onto the secure transfer apparatus 209 via the internal network 204. Thus, secure transfer apparatus 209 behaves as if it were a server to terminal 205J and screens are presented at terminal 205J, an example of which is being shown in FIG. 9, under the operation of the program scripts 604.

Figure 9:
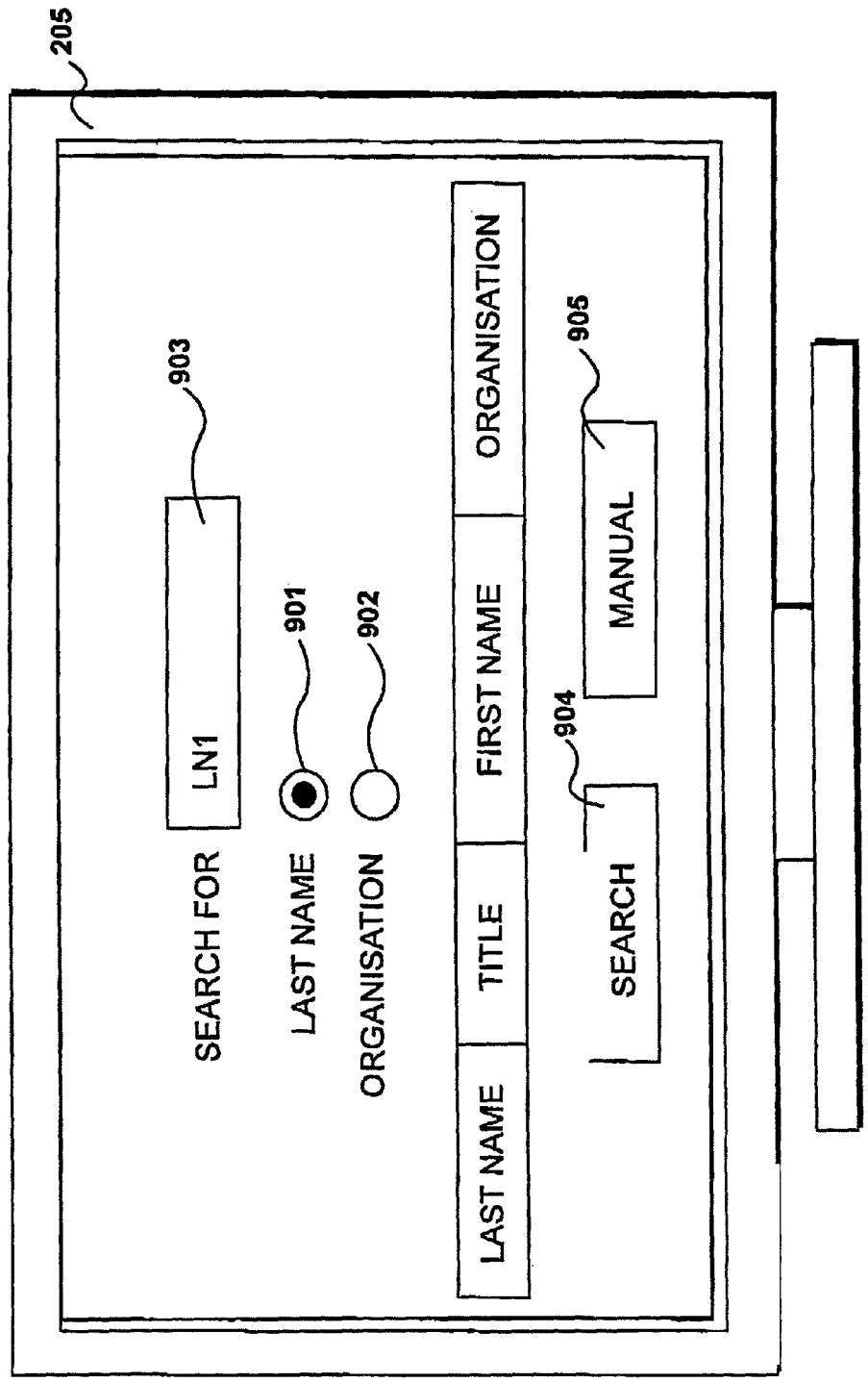
FIG. 9 shows a user terminal initiating a search.

As shown in FIG. 9, a radio button 901 allows a user to search for entries in an address book in last name order, with a similar radio button 902 allowing a similar search to be made in organisation name order. For the purposes of illustration, last name order has been selected.

A text box 903 allows the last name of interest to be entered whereafter a search button 904 is activated by manual operation of a mouse.

FIG. 10

Following the activation of search button 904, search results are presented in FIG. 10. For the purposes of this example, three entries have been identified each with last name LN1. In addition to this last name, the entries identify a title, a first name and a name of their organisation. Thus, when presented with this information, an operator makes a selection and details of the recipient are supplied to the secure transfer apparatus.

In the example shown in FIG. 9, the user terminal 205J is also provided with a manual entry button 905. Upon activation of button 905, the user is presented with a screen of the type as illustrated in FIG. 11.

FIG. 11

Figure 11:
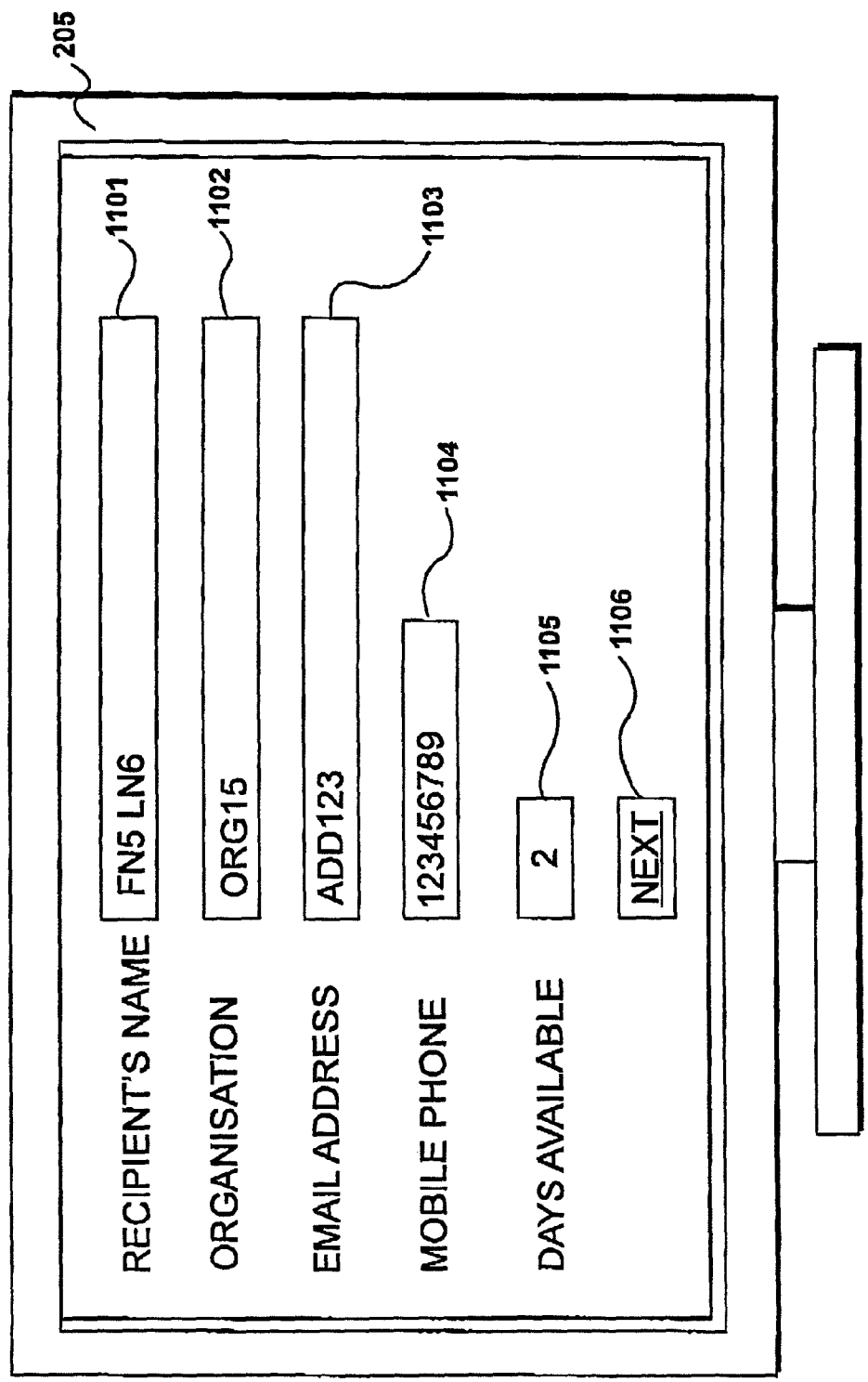
FIG. 11 shows the terminal of FIG. 9 using free address entry.

The form illustrated in FIG. 11 is served to the user terminal 211 in order for the user to identify recipient details by manual entry. Thus, the recipient's name is entered at a field 1101 and their organisation is identified in a field 1102.

Field 1103 is provided for receiving details of the recipient's email address and in addition the recipients mobile telephone number is entered in a field 1104. In an alternative embodiment, alternative modes of communication could be provided, such as a pager number.

A further security feature is provided by only allowing the data to be transferred for a specified period of time and greater security can be achieved by shortening this period.

In the preferred embodiment, the data remains available for a specified number of days and for the purposes of illustration a field 1105 has been provided for receiving details of the number of days during which the data remains available and in this example the number 2 has been provided. Thus, if the data is not transferred to the recipient within this two day window, the data will be deleted from the encrypted storage device 304 and will no longer be available.

Some operators, such as operators 206 and 207, may effect manual entry and when served with the screen shown in FIG. 5 they will be presented with manual entry selection button 905. Other more junior users 205J may be defined as having a status such that it is not possible for them to make a manual entry. The secure transfer apparatus is configured with data defining which users may invoke manual entry. For users that do not have the appropriate status, manual entry button 905 is not displayed when they are presented with a screen substantially similar to that shown in FIG. 9. For these junior users, it is only possible for them to transfer data to recipients detailed in the address book.

FIG. 12

Figure 12:
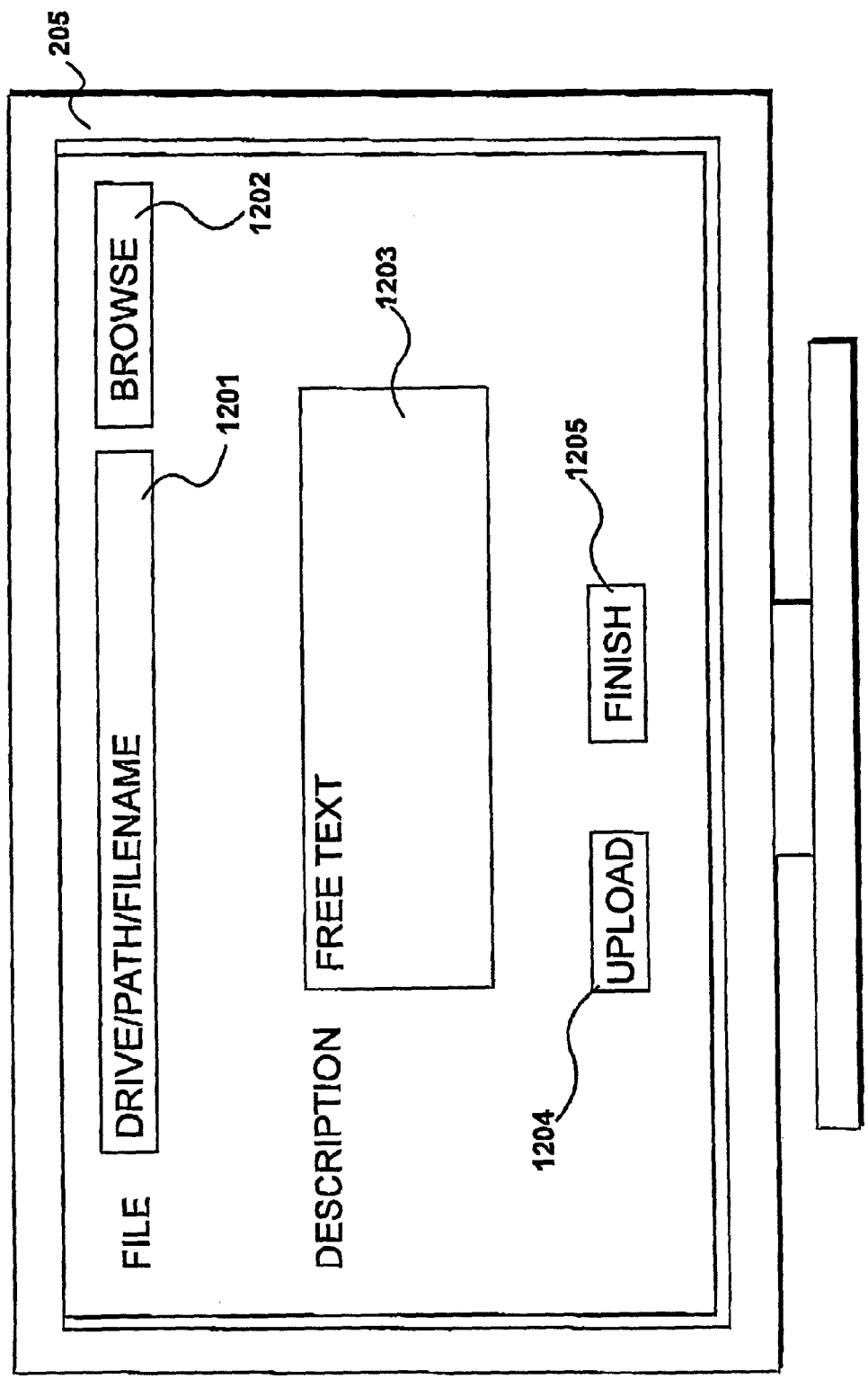
FIG. 12 shows the terminal of FIG. 9 during file selection.

Having identified the recipient, either through the address book as illustrated in FIG. 10 or by manual entry as illustrated in FIG. 11, it is necessary for the user to identify the file or files to be transferred. To achieve this, a screen is presented of the type illustrated in FIG. 12.

In a field 1201 an entry is made identifying the location of the file in terms of its drive and its path, along with a file name. This data could be entered manually although in the majority of situations it is more likely that a browsing operation will be performed by activation of browse button 1202.

In addition to the file being identified, a preferred embodiment allows additional text to be included in field 1203. Thus, this free text could include a description of the data being transferred, particularly useful if the file name itself does not convey obvious meaning.

Having made the selection of the file of interest and, if appropriate, entering fee text the request is finalised by activation of upload button 1204, meaning that a further file is required, or by the activation of finish button 1205, meaning that the request is complete. Thus, in this way, several files may be selected and uploaded before completing the transaction.

It is also appreciated that in alternative embodiments entire directories or entire volumes of data may be selected and transferred. The availability of such procedures could also be configured for a particular installation so as to optimise the efficiency of operation within the environment. In particular, the use of the system should be made as easy as possible while at the same time maintaining security, certainty and workflow efficiency.

FIG. 13

For some users, having selected a recipient and identified a files or files, the data will immediately become published and available for transfer from encrypted storage device 304. However, for other users, as part of the workflow scheme, it would be necessary for authorisation to be obtained from a supervisor.

For the purposes of illustration, it is assumed that the user at terminal 205J does require authorisation and that within the environment described, this authorisation must be obtained from a supervisor at terminal 208S.

When authorisation is required, the secure transfer apparatus 209 will present supervisor 208S with a screen of the type illustrated in FIG. 13. The screen of FIG. 13 notifies the supervisor that file transfers are awaiting authorisation. A field 1301 is included for identifying the name of the file, along with a field 1302 including the description. The size of the file is identified in field 1303, being information derived from the file system itself and not provided by the user.

The intended date of publication is illustrated at field 1304 which will usually be the date on which the user made the request for the data to be transferred. In addition, a field 1305 identifies the number of days left during which the recipient can invoke the transfer.

A single line entry is shown in the example of FIG. 13 but in practice many entries could be included and the supervisor will be required to authorise the transfer or reject the transfer by appropriate operation of authorise button 1306 or reject button 1307. Thus, in this example, upon selecting entry 1308 (by a mouse click or by scrolling) and activating authorise button 1306, the transfer is fully authorised resulting in the question asked at step 802, as to whether the request has been approved, being answered in the affirmative.

FIG. 14

As illustrated at step 805, an SMS message is sent to the recipient identifying the one-time password. The recipient's mobile telephone 402 is shown in FIG. 4, having received a message 1401 identifying the one-time password. In practice, this message could also include an identification of the organisation concerned and a brief description as to how the message is to be used.

FIG. 15

Having received an invitation via an email and a one-time password via SMS, the recipient is now in a position to login as identified at step 702. In order to login, the recipient, using their web browser, identifies the appropriate HTTPS://domain name which presents the recipient with a screen of the type illustrated in FIG. 15. In response to this screen, the recipient 401 is required to enter their user name in field 1501 and their password in field 1502. Having entered this information, the user activates submit button 1503, resulting in the information being conveyed back to the secure transfer apparatus.

FIG. 16

Figure 14:
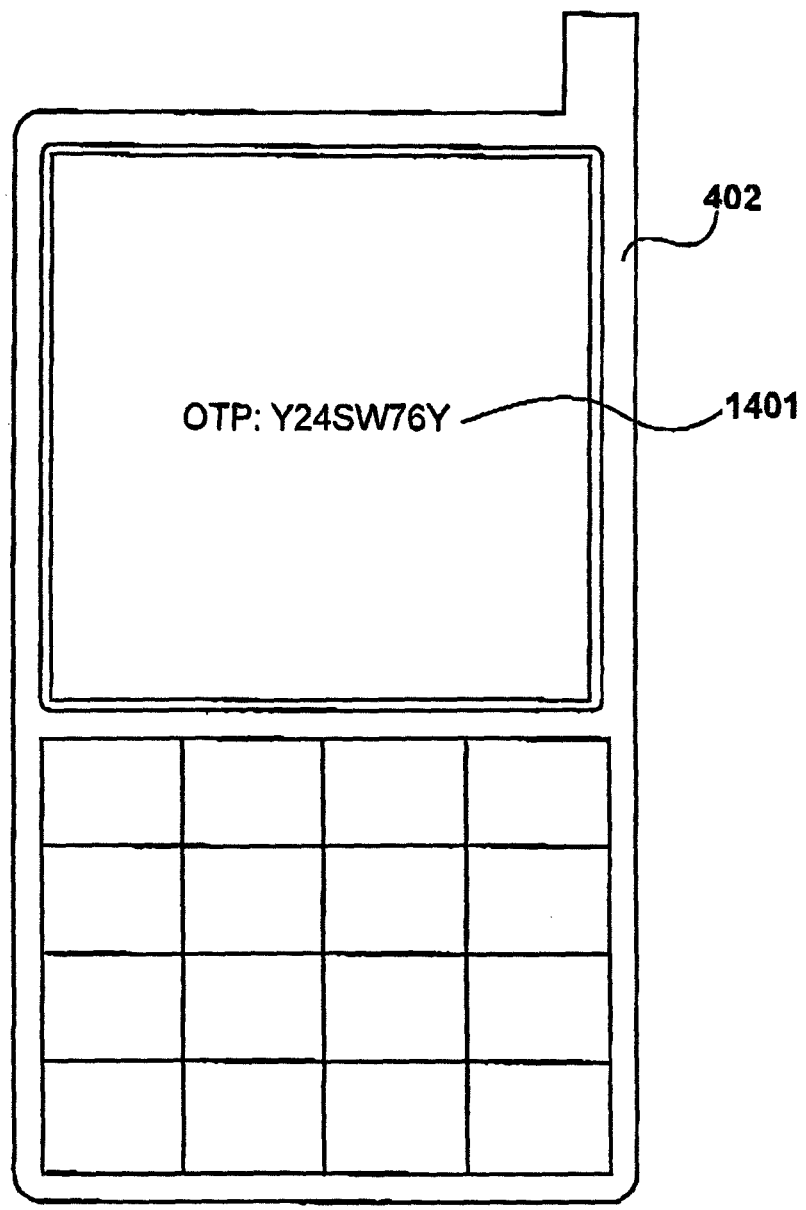
FIG. 14 shows the receiving of a one time password on the mobile phone of the recipient.
Figure 16:
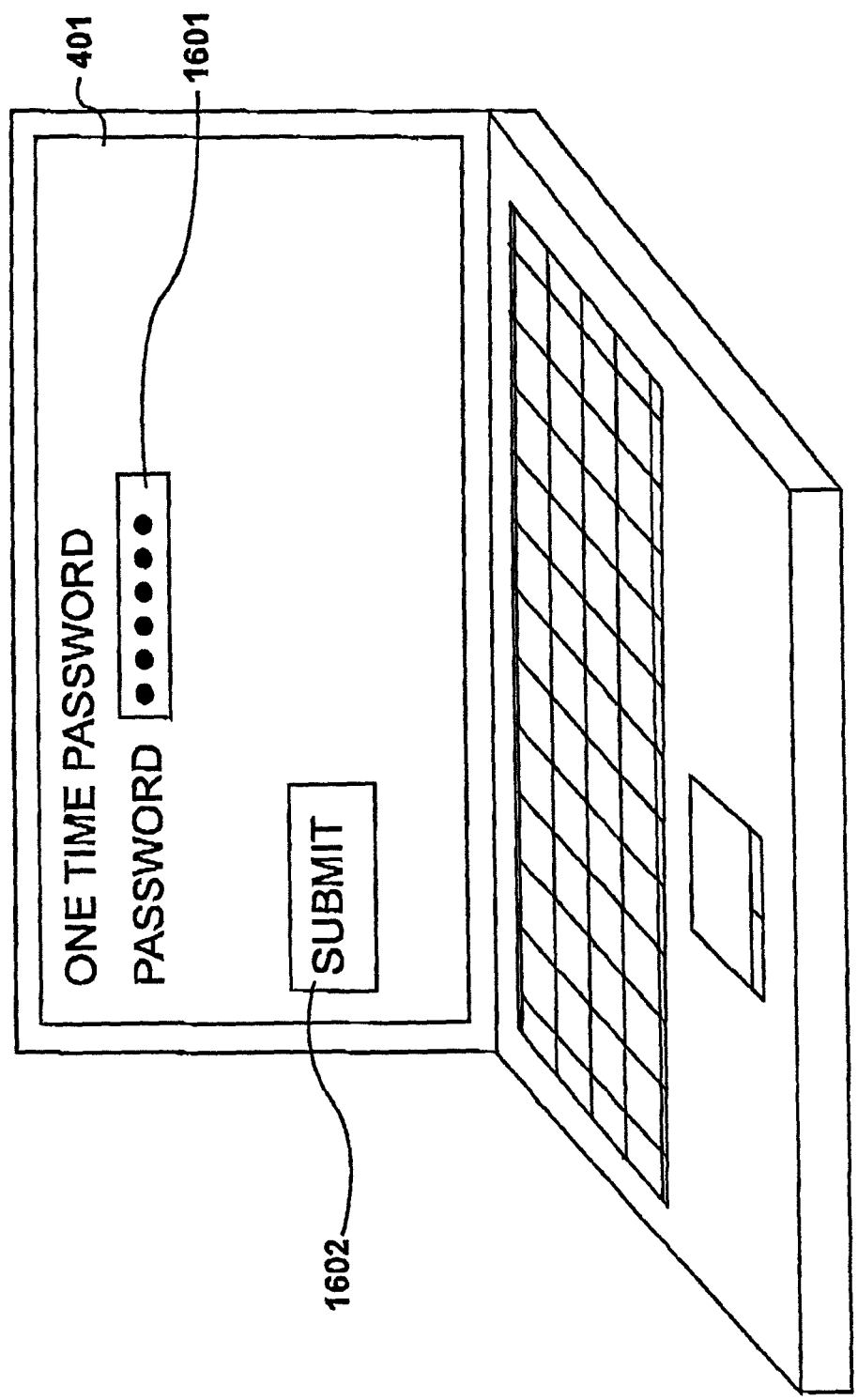
FIG. 16 shows the entry of the one time password by the recipient.

Assuming the user name and password entered and returned back to the secure transfer apparatus is considered valid, the secure transfer apparatus 209 issues a further screen of the type illustrated in FIG. 16 requesting details of the one-time password. To effect the transfer, the user must have access to their mobile telephone 402 so that the one-time password, as illustrated in FIG. 14, may be entered in field 1601 and returned back to apparatus 209 by activation of submit button 1602. Thus, assuming the one-time password is valid the data will be served to the user as identified at step 704.

FIG. 17

Figure 17:
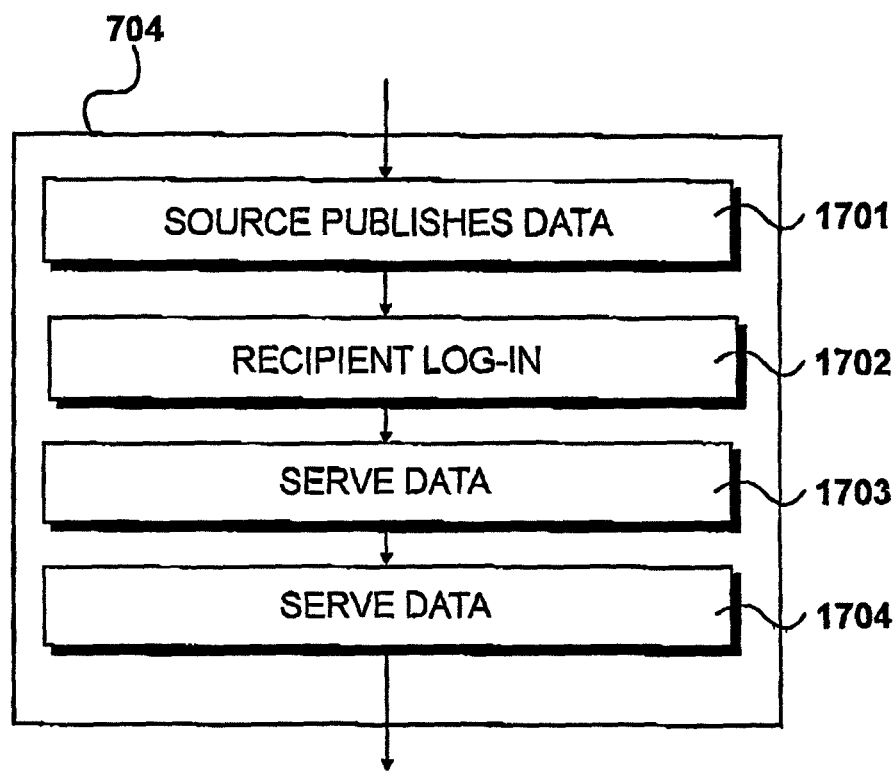
FIG. 17 shows detailed procedures for serving data, identified in FIG. 7.

Procedures 704 for the serving of data are detailed in FIG. 17.

At step 1701 the secure transfer apparatus 209 receives a command from the recipient 211 for the data file to be transferred.

Upon receiving this (valid) command, the transfer apparatus 209 reads data from the encoded storage device 304 and encodes this data using encryption procedures 605 for secure transmission. At step 1703, the data having being encoded is transferred to the recipient and at step 1704 the fact that a transfer has occurred is logged.

FIG. 18

Figure 18:
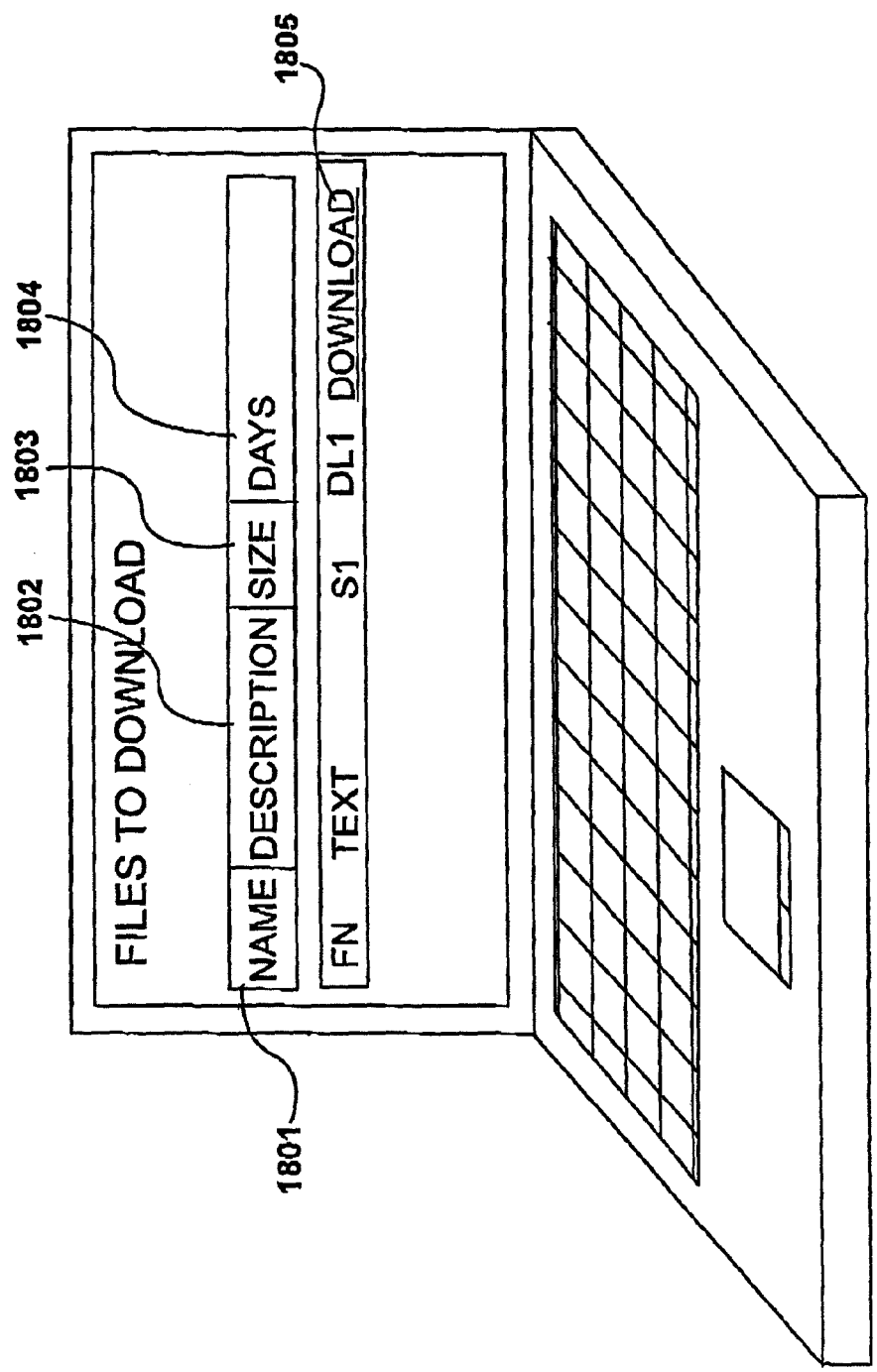
FIG. 18 shows operations performed by the recipient in order to effect the transfer of data.

In order for the recipient to issue a command for the data to be transferred, the transfer apparatus, acting as a server, conveys a page to the recipient of the type illustrated in FIG. 18.

Each entry for a downloadable file includes the file name in a field 1801. In addition, a description is included in a field 1802 with a size of the file being shown in a field 1803.

A field 1804 identifies the days remaining during which a download may take place. The actual downloading of the file is activated by selecting an appropriate download link 1805, which then results in a command being issued which is received and processed as illustrated at step 1701.

If a supervisor rejected authorisation of the transfer, the selected file would not be published and would not therefore appear on the list illustrated in FIG. 18. Similarly, if a file has been published but the window during which a download could occur has passed, the file is not longer included on the list. Thus, the entry included in field 1804 for available downloadable files must always be positive otherwise the entry will not appear.

The transfer of the data file occurs in an encrypted form with decryption being performed at the recipients terminal such that once received, the file is stored at a location previously pre-configured by the recipient.

The invention claimed is:

1. An apparatus for facilitating a secure transfer of a data file from a source located within a first organisation having an internal network to a recipient located within a second organisation via the Internet, said apparatus comprising:
   a processing device;
   a first storage device that stores instructions for facilitating said secure transfer;
   an encrypting storage device that encrypts and stores encrypted copies of data files for secure transfer;
   a first interface device that communicates with said internal network; and
   a second interface device for communicating with the Internet; wherein said processing device is configured to:
   receive, using said first interface device, a request from a first user having a first status to transfer a data file from said source to said recipient, said request identifying an identified data file and a recipient address;
   request, using said first interface device, an authorisation from a second user having a second status, for the transmission of the identified data file only after receiving said authorisation;
   receive, using said first interface device, said authorisation for the transmission of the identified data file;
   copy, using said first interface device, only after receiving said authorisation, the identified data file from said source to said encrypting storage device;
   issue an email, using said second interface device, to said recipient address identifying the location of said identified data file and a first password;
   receive a request, using said second interface device, from said recipient in response to the recipient identifying said location and providing said first password; and
   transmit, using said second interface device, said identified data file from said encrypting storage device to said recipient; wherein:
   said apparatus is located within said first organisation,
   said internal network is configured to prohibit transmission of a data file via the Internet without said apparatus receiving said authorisation,
   which said authorisation must be provided by the second user having a second status.

2. The apparatus of claim 1, wherein said first storage device stores instructions for an operating system, a series of scripts and an interpreter for interpreting said scripts.

3. The apparatus of claim 1, wherein:
   said first storage device stores instructions for an encoding process and a plurality of security certificates; and
   said processing device is configured to encode said identified data file prior to transferring said identified data file to the recipient.

4. The apparatus of claim 1, wherein said encrypting storage device is an encrypting disc such that data written to said encrypting disc is encrypted and data read from said encrypting disc de-encrypted.

5. The apparatus of claim 1, wherein said local terminal is configured to receive manual input from a first user that identifies a plurality of files stored on a local network facility.

6. The apparatus of claim 1, wherein said processor is further configured to issue a second password to the recipient by an alternative transmission mode.

7. A method of securely transferring a data file from a source located within a first organisation having an internal network to a recipient located within a second organisation via the Internet, comprising the steps of:
   receiving a request from a first user having a first status to transfer an identified data file from said source to said recipient, said request identifying said identified data file and a recipient address;
   requesting an authorisation, from a second user having a second status, for the transmission of the identified data file only after receiving said authorisation;
   receiving said authorisation for the transmission of said identified data file;
   copying, only after receiving said authorisation, said identified data file from said source to an encrypting storage device that encrypts and stores said identified data file;
   issuing an email to said recipient address identifying the location of said identified data file and a first password;
   receiving a request from said recipient identifying said location and providing said first password; and
   transmitting said identified data file from said encrypting storage device to said recipient; wherein:
   said encrypting storage device is located within said first organisation,
   said internal network is configured to prohibit the transmission of data files via the Internet without first having received said authorisation,
   which said authorisation must be carried out by said second user having a second status.

8. The method as claimed in claim 7, wherein:
   a second password is sent to the recipient via an alternative transmission mode; and said step of transferring said identified data file is performed after said recipient has performed a step of providing said second password.

9. The method of claim 8, wherein said alternative transmission mode is a wireless mode using a mobile telephone or a pager.

10. The method of claim 7, wherein:
said step of copying said identified data file to an encrypting storage device produces a copied data file that is available for transfer; and
said copied data file only remains available for transfer for a predetermined period.

11. The method of claim 7, wherein receipt of said authorisation for the transmission of said identified data file causes the logging of data to the effect that transmission has been approved.

12. The method of claim 7, wherein said step of transmitting said identified data file causes the logging of data to the effect that said identified data file has been transferred.

13. The method of claim 7, wherein said step of transmitting said identified data file includes encoding said identified data file with a reference to a stored certificate.

14. The method of claim 7, wherein said authorisation makes reference to the status of a user logged onto the first local terminal, wherein:
a first status user can only transfer data to addresses contained within a predefined address book; and
a second status user having a status higher than said first status user can transfer data to any specified email address.

15. A non-transitory computer-readable medium having computer-readable instructions executable by a computer, that, when executed by the computer, cause the computer to securely transfer a data file from a source located within a first organisation having an internal network to a recipient located within a second organisation via the Internet, by performing the steps of:
receiving a request using an input device connected to a local network from a first user having a first status to transfer an identified data file from said source to said recipient, said request identifying said identified data file and a recipient address;
requesting an authorisation, from a second user having a second status, for the transmission of said identified data file only after receiving said authorisation;
copying, only after receiving said authorisation, said identified data file from said source to an encrypting storage device that encrypts and stores an encrypted identified data file;
issuing an email to said recipient address identifying the location of said encrypted identified data file and a first password;
receiving a request from said recipient identifying said location and providing said first password; and
transmitting said encrypted identified data file to said recipient; wherein:
said encrypting storage device is located within said first organisation,
said internal network is configured to prohibit the transmission of data files via the Internet without having received said authorisation,
which said authorisation must be carried out by said second user having a second status.

16. The non-transitory computer-readable medium of claim 15, having further instructions that, when executed by the computer, cause the computer to perform additional steps of:
issuing a second password to the recipient via a wireless mode of transmission; and
transmitting said identified data file only after receiving said second password from the recipient.

17. The non-transitory computer-readable medium of claim 15, having further instructions that, when executed by the computer, cause the computer to only make the encrypted files available for transmission for a predetermined period of time.

18. The non-transitory computer-readable medium of claim 15, having further instructions that, when executed by the computer, cause the computer to create a data log of identified data files being approved and of identified data files being transmitted.

19. The non-transitory computer-readable medium of claim 15, having further instructions that, when executed by the computer, cause the computer to maintain an address book of approved recipients and ensure that low status users can only transfer identified data files to recipients identified from said address book.

* * * * *